Sept. 1, 1942. G. D. BAGLEY 2,294,439
METHOD OF AND APPARATUS FOR WELDING
Filed May 9, 1940

INVENTOR
GLEN D. BAGLEY
BY
*Greenewald*
ATTORNEY

Patented Sept. 1, 1942

2,294,439

UNITED STATES PATENT OFFICE 2,294,439

METHOD OF AND APPARATUS FOR WELDING

Glen D. Bagley, Lewiston, N. Y., assignor to The Linde Air Products Company, a corporation of Ohio Application May 9, 1940, Serial No. 334,099

16 Claims. (Cl. 113—59)

The invention relates to processes for joining metal members by welding, and refers more particularly to welding processes which require or which are aided by the provision of a backing-up means.

Certain precautions are necessary in uniting metal members by fusion-deposition welding to prevent molten weld metal from running out of the welding seam and to make possible the production of a welded joint having a smooth surface on its back side (the side opposite to that on which the welding operation is to be performed). One expedient which has been proposed to achieve these results is the use of a heavy strip of copper, steel or other metal known as a backing-up strip to back up the weld seam during the deposition of weld metal.

In some welding operations the use of a metal backing-up strip is objectionable because of the tendency to chill the weld metal, and on occasion to set up harmful stresses. Moreover, welding action along the deeper portions of a welding seam may be incomplete; in such cases a dirty or unsound weld may result from premature setting of the weld metal. Additionally, if the members to be welded are not perfectly flat, it is extremely difficult to make the metal backing-up strip follow the surface closely enough to prevent weld metal from spreading out between the backing-up strip and the back surface of the members being welded.

There is disclosed in Patent 2,145,009, issued on application of James M. Keir, a method of backing-up welds by the use of a granular refractory material which bridges the welding seam along the back surface of the members to be welded. The process disclosed in that patent admirably solves many of the problems presented in backing up welds. The present invention contemplates so improving that process as to make it particularly well adapted for use in applications where a series of welds is to be made, such as in large scale production work.

It is an object of this invention to provide means for backing a weld with granular refractory material, which means is particularly adapted for use in making a series of welds, in making long welds, and in making welds where the members to be welded are moved relative to the point of welding. Another object is a method of automatically applying granulated refractory backing material to the back surface of welds as the welding operation proceeds. In the accompanying drawing.

The invention comprises a method of weld-uniting metal members which comprises assembling such members in contiguous relation to provide a groove or seam to be welded, establishing, in operative relation with a portion of such groove or seam, means for melting and depositing metal, progressively advancing successive portions of the welding groove or seam toward and under such source of molten metal to deposit molten metal in and along said groove or seam, and, in synchronism therewith, progressively bringing granulated refractory material into contact with each successive portion of the back side of the groove or seam as it advances toward such source of molten metal. Additionally, the invention comprises welding apparatus including welding means, means for moving successive portions of a welding groove or seam into operative relation with the welding means, movable means for bringing backing material into contact with the back side of such successive portions of the welding groove as the latter are moved into operative relation with the welding means, and means for synchronizing the movement of such movable means and the welding groove.

In accordance with the invention, metal members to be weld-united are arranged in the usual manner. An endless belt is placed adjacent to the back side of the members, and onto this endless belt is placed granulated refractory backing material in an amount sufficient to insure intimate contact between the back surface of the members to be welded and the refractory matrial. The material bridges the back side of the work and air is thus excluded from the back of the welding seam and the spreading out of weld metal along the underside of the members being welded is prevented. The endless belt on which the backing material is placed may be so positioned as to underlie the entire length of the welding seam or little more of the welding seam than that portion where welding is in progress.

Figure 1:
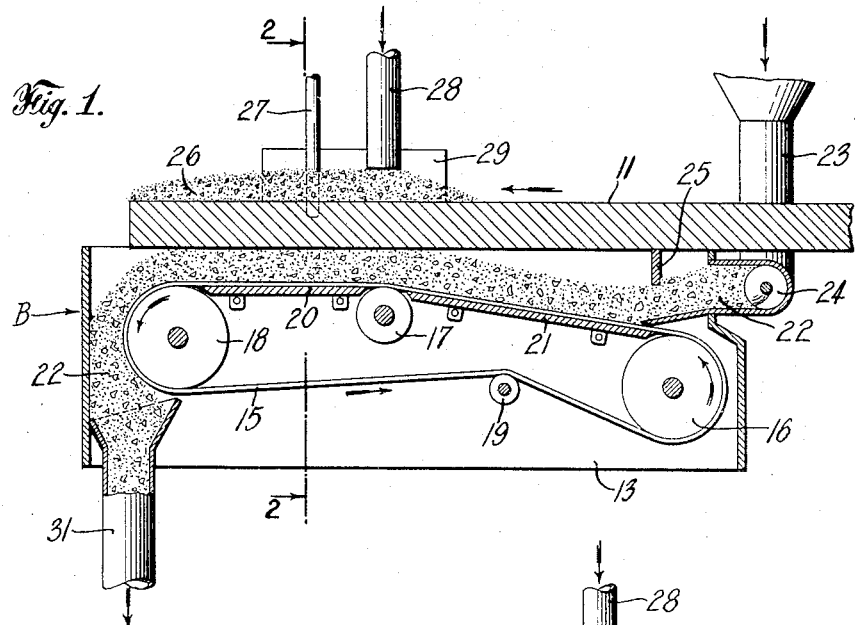
Fig. 1 is a cross sectional view representing metal members having bevelled edges assembled in contiguous relation for electric welding and provided with backing-up material according to this invention.
Figure 2:
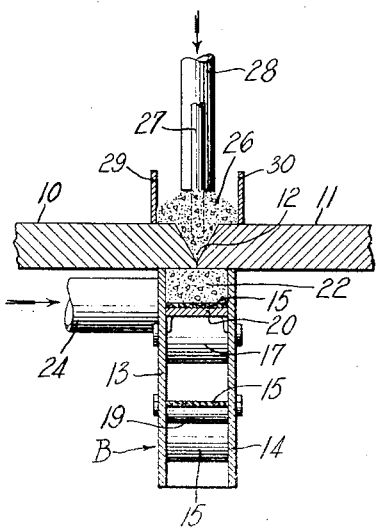
Fig. 2 is a view taken along the line 2—2 of Fig. 1 looking in the direction of the arrows.

In Figs. 1 and 2 of the drawing the latter condition is illustrated. Referring to the drawing, plates 10, 11 to be joined by welding are placed in abutting relation on a suitable work support, not shown, adapted to be moved longitudinally. The plates 10, 11 are suitably bevelled to form a welding seam 12. Immediately below the plates 10, 11 is placed a device B comprising side members 13, 14 adapted to be placed in contact with the back surface of the plates 10, 11. Mounted in the device B is a movable means such as an endless belt or conveyor 15 which passes over idler rolls 16, 17 and a driving roll 18. A tension-adjusting roller 19 is provided for adjusting the tension in the belt 15. Underlying the upper portions of the belt 15 are a horizontal supporting member 20 and an inclined supporting member 21 to prevent sagging of the belt between the rolls. Granular refractory material 22 is fed on to the belt 15 as it passes over the lower end of the inclined member 21 and is continuously elevated by the inclined portion of the belt into contact with the moving plates 10, 11 below the seam 12. The backing material 22 is supplied from a hopper 23 by means of a screw conveyor 24 and is allowed to fall on to the belt 15 by gravity. A levelling device or guide 25 is disposed upon and extends across the conveyor and is operative to regulate the depth of the material carried by the conveyor and to maintain the supply of material on the conveyor at a predetermined depth. The backing material 22 is laterally confined by the back surface of the plates 10, 11 the side members 13, 14 of the device B and by the belt 15.

The plates 10, 11 are suitably welded by the process described in U. S. Patent 2,043,960, issued on application to L. T. Jones, H. E. Kennedy and M. T. Rotermund jointly. The welding seam 12 is overfilled with a prefused granular refractory material 26, and a welding electrode 27 is embedded in this material. The welding composition 26 is supplied through a feed tube 28 and is restrained by side plates 29, 30 placed one on each side of the welding seam.

During welding, successive portions of the welding composition 26 are fused and metal is deposited from the electrode 27 into the welding seam 12 under a blanket of welding composition 26. As the weld is made, the plates 10, 11 are moved longitudinally under the welding mechanism so that the electrode 27 remains longitudinally fixed. As the plates 10, 11 are moved, the endless belt 15 carrying backing material 22 is caused to move in the same direction and at the same speed. Backing material is therefore continuously elevated and pressed against the back surface of the plates 10, 11 in the vicinity of the welding zone. The driving roll 18, which causes the belt 15 to move, may be driven independently of the work support or, suitably, may be connected so as to be synchronized with the work support driving means. As the belt 15 passes over the roll 18, the backing material falls off the belt and may be collected by a suitable device 31 which may be operated by vacuum. The unfused material may be re-used but any large aggregate should first be removed.

Figure 3:
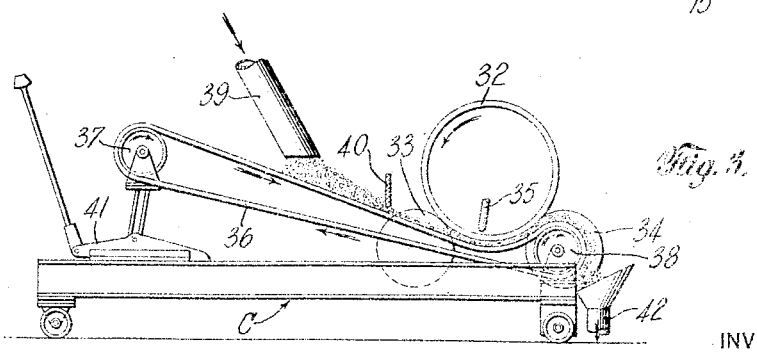
Fig. 3 is a diagrammatic representation of the application of the invention to the preparation of a girth weld in a cylindrical member.

The invention is particularly well adapted for use in backing up welds to be made in cylindrical or hollow members such as pipes, tanks, and the like. Fig. 3 diagrammatically illustrates the use of the invention in backing up a girth weld being made in a tank 32. The tank 32 is mounted on suitable rollers 33, 34 which cause the tan to rotate. A welding electrode 35 is operatively placed within the tank 32. A flanged endless belt 36 mounted on rolls 37, 38 is provided and maintained adjacent the welding zone. Granulated refractory backing material is fed onto the belt 36 through a feed tube 39. A levelling device 40 is desirably provided to prevent undue piling up of backing material on the belt 36. The rolls 37, 38 are mounted on a movable carriage C, suitable provision such as a jack 41 being provided for adjusting the height of the roll 37 so as to maintain the proper tension in the belt 36 regardless of the size of the tank or other member being welded. During the welding operation, as the tank 32 is rotated, the belt 36 is moved so that backing material is supplied progressively to the welding zone at the same rate at which the welding proceeds, and in a predetermined arc which is substantially less than the circumference of the hollow member or tank. The belt may be driven through one of the rollers 37, 38 or may be caused to move solely by friction between the backing material and the tank 32. The backing material falls off the belt 36 as it passes over the roll 38 and is collected by a suitable device 42 for re-use.

The refractory backing material used may have any of a wide variety of compositions. The material should be of such a nature that it can be fused by welding heat; suitably, but not necessarily, it may have a melting point not substantially higher than that of the metal to be welded. Material composed chiefly of silicates of the alkaline earth metals and magnesium, substantially free from uncombined iron oxides and gas forming ingredients, is preferred. Fluidifiers or other fluxes may be added if desired. Preferably, the ingredients of the material should be mixed, prefused to complete chemical reactions between the ingredients, and subsequently crushed or ground to the desired size. One material well suited to use in the invention contains about 31% CaO, 11% MgO, 52% $SiO_2$ and 4% $Al_2O_3$ to which a small proportion of an alkaline earth fluoride, say 5%, may be added.

If an electric welding operation of the type illustrated in Figs. 1 and 2 is employed, the same refractory material may be used as the welding composition and as backing material. The composition above described is well suited for such use, but material of higher or lower melting point may be appropriate on occasion.

As pointed out in Patent 2,145,009, the use of a granulated refractory material as the backing means is advantageous in that a welding bead is formed along the back surface of the members being welded. Moreover, exceptionally clean and sound welds are produced.

While the method of the invention is particularly well adapted to electric welding such as electric arc welding employing either a bare or coated metal electrode or a carbon electrode, it may be applied to other welding operations such as gas and "Thermit" welding where metal is melted and deposited. Such uses of the method of the invention are to be understood as within the scope of the invention.

Also, while particular illustrations of the invention as applied to butt welding and the preparation of welds in cylindrical members have been given, the invention is not limited to these applications but may be adapted readily to other uses. And although emphasis has been placed in the description and the drawing of applications of the invention in which the work has been moved past metal-depositing means and backing means, the invention may be used effectively in applications where the work is fixed and metal-depositing means and backing means are moved relative to the work.

I claim:

1. A process of welding which comprises depositing molten metal in and along successive portions of a welding groove while progressively bringing granulated refractory material into contact with the back side of such successive portions of the welding groove in synchronism with such molten metal depositing operation.

2. A process of weld-uniting metal members which comprises assembling such members in contiguous relation to provide a seam to be welded and fusion-depositing weld metal in and along successive portions of such seam while progressively bridging such successive portions of said seam with granulated refractory material on the opposite side thereof and in synchronism with such weld metal depositing operation.

3. A process of weld-uniting metal members which comprises assembling such members in contiguous relation to provide a groove to be welded; providing a source of molten metal; progressively advancing successive portions of said welding groove toward and under said source of molten metal, whereby to deposit molten metal in and along said groove; and, in synchronism therewith, progressively bringing granulated refractory material into contact with each such successive portion of the back side of said groove as it advances toward the source of molten metal.

4. A process of weld-uniting metal members which comprises juxtaposing such members to provide a welding groove therebetween, establishing in operative relationship with a portion of said groove means for melting and depositing metal, advancing successive portions of said groove into operative relationship with said metal melting and depositing means, whereby to deposit metal in and along the top side of said groove, establishing in operative relationship with a portion of the back side of said groove means for bringing granular refractory material into contact with the back side of that portion of said groove into which metal is being deposited, and synchronizing such means for bringing material into contact with the back side of the groove with means for advancing the welding groove, whereby to bring into contact with each successive portion of the back side of said groove a fresh supply of granular refractory material as such successive portions of said groove are filled with metal.

5. Welding apparatus comprising, in combination, welding means; means for moving successive portions of a welding seam into operative relation with said welding means; a conveyor for progressively bringing granular refractory material into contact with the back side of said successive portions of the welding seam in synchronism with the movement of said successive portions into such operative relation with said welding means; and means for depositing granular refractory material onto said conveyor.

6. Welding apparatus comprising, in combination, welding means; means for moving a welding groove into operative relation with said welding means; movable means for bringing backing material into contact with successive portions of the back side of said welding groove as the latter is moved into such operative relation with said welding means; means for depositing granular refractory backing material onto said movable means; and means for synchronizing the movement of said movable means and said welding groove.

7. Welding apparatus comprising, in combination, welding means; means for moving a welding groove into operative relation with said welding means; a belt adapted to bring granular refractory material into contact with successive portions of the back side of said welding groove in synchronism with the movement of said welding groove into such operative relation with said welding means; and means for supplying granular refractory material to said belt.

8. Welding apparatus comprising, in combination, welding means; means for moving a welding groove into operative relation with said welding means; a belt adapted to bring granular refractory material into contact with successive portions of the back side of said welding groove in synchronism with the movement of said welding groove into such operative relation with said welding means; means for supplying granular refractory material to said belt; and means for collecting such material after it has been used.

9. Welding apparatus for forming a welded seam between members to be welded comprising, in combination, welding means; means movably supporting said members to be welded to move successive portions of the same into operative relation with said welding means; and means for progressively bringing granular refractory material into engagement with the back side of said successive portions of said members in synchronism with the movement of said successive portions into operative relation with said welding means, said last-named means comprising a support extending parallel to said members adjacent the back side of and substantially aligned with said seam, movable means engaging said support and supported thereby, and means for discharging granular refractory material upon said movable means.

10. Welding apparatus as claimed in claim 9, including means for laterally confining the granular refractory material discharged upon said movable means.

11. Welding apparatus as claimed in claim 9, including means disposed between the members to be welded and said movable means for regulating the depth of the granular refractory material carried by said movable means.

12. A process of welding which comprises continuously elevating granular backing material into contact with successive portions of the back side of parts forming a welding seam while moving said welding seam into operative relationship with welding means, and causing said granular backing material to remain in contact with said back side of the parts forming said seam so that the movement of the granular backing material is synchronized with the movement of the parts forming said seam until the welding operation has been completed.

13. A welding process for forming a welded seam between hollow members comprising rotating said members and supplying granular backing material into contact with successive portions of the back side of said seam as the latter is moved into operative relationship with welding means, and causing the granular backing material to move in synchronism and in contact with said members, until the welding operation has been completed, through only a predetermined arc which is substantially less than the circumference of said hollow members.

14. Welding apparatus for forming a welded seam between members comprising, in combination, means movably supporting such members, a conveyor having a portion disposed beneath said seam for continuously elevating granular backing material into engagement with said members, and means for supplying granular backing material to said conveyor.

15. Welding apparatus for forming a welded seam between hollow members comprising, in combination, means rotatably supporting such hollow members, a conveyor having a portion disposed beneath said seam to bring granular backing material into engagement with said hollow members, and means for supplying granular backing material to said conveyor.

16. In the combination claimed in claim 15, a guide disposed upon and extending across said conveyor and operative to maintain the supply of granular refractory backing material thereon at a predetermined depth.

GLEN D. BAGLEY.